US009287908B1

(12) United States Patent
Suarez

(10) Patent No.: US 9,287,908 B1
(45) Date of Patent: Mar. 15, 2016

(54) WIRELESS-CHANNEL CHARACTERIZATION AND EQUALIZATION

(71) Applicant: The United States of America, as represented by the Secretary of the Army, Washington, DC (US)

(72) Inventor: John Suarez, Brooklyn, NY (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/496,318

(22) Filed: Sep. 25, 2014

(51) Int. Cl.
| H04B 1/00 | (2006.01) |
| H04B 15/00 | (2006.01) |
| H04B 1/04 | (2006.01) |
| H04B 17/345 | (2015.01) |
| H04B 17/10 | (2015.01) |
| H04B 7/06 | (2006.01) |
| H04B 1/40 | (2015.01) |

(52) U.S. Cl.
CPC ............ *H04B 1/0475* (2013.01); *H04B 1/0483* (2013.01); *H04B 1/40* (2013.01); *H04B 7/061* (2013.01); *H04B 17/104* (2015.01); *H04B 17/345* (2015.01)

(58) Field of Classification Search
CPC .. H04B 1/0475; H04B 17/345; H04B 17/104; H04B 1/0483; H04B 7/061; H04B 1/40
USPC .............. 455/63.4, 63.1, 67.11, 67.13, 67.14, 455/562.1, 575.7
See application file for complete search history.

(56) References Cited

U.S. PATENT DOCUMENTS

| 6,115,409 A * | 9/2000 | Upadhyay ............ H01Q 3/2605 370/487 |
| 6,177,906 B1 * | 1/2001 | Petrus ...................... H01Q 3/26 342/373 |
| 6,201,841 B1 * | 3/2001 | Iwamatsu ......... H04L 25/03006 375/285 |
| 7,453,923 B2 | 11/2008 | Leblond et al. |
| 8,184,751 B2 | 5/2012 | Lackey |
| 8,526,939 B2 | 9/2013 | Harteneck |
| 8,682,170 B2 * | 3/2014 | Prucnal .................. H04B 1/109 398/115 |
| 8,693,810 B2 * | 4/2014 | Suarez ................... H04B 1/525 370/278 |
| 2005/0148302 A1 | 7/2005 | Huhtala |

(Continued)

OTHER PUBLICATIONS

Suarez, John. "Electro-Optic Counter Phase Modulation for Broadband Radio-Frequency Interference Cancellation." Ph.D. dissertation, Princeton University. Published on Apr. 2012 in Princeton, NJ USA.

*Primary Examiner* — Marceau Milord
(74) *Attorney, Agent, or Firm* — Azza Jayaprakash

(57) ABSTRACT

Various embodiments are described that relate to signal distortion for delay and attenuation. A transmission antenna can transmit a baseline signal to a reception antenna and then transmit a test signal to the reception antenna. The baseline signal and test signal can be processed to determine undesirable attenuation and delay coefficients. These coefficients can be transmitted back from the reception antenna to the transmission antenna. Based on these coefficients, a determination can be made on how to modify a signal of interest such that the signal of interest arrives from the transmission antenna to the reception antenna absent the undesirable attenuation and delay coefficients. The transmission antenna can transmit the modified signal of interest such that it arrives at the reception antenna absent the undesirable delay and attenuation coefficients.

20 Claims, 14 Drawing Sheets

(56) References Cited

U.S. PATENT DOCUMENTS

| | | |
|---|---|---|
| 2010/0220003 A1 | 9/2010 | Scott |
| 2011/0223869 A1 | 9/2011 | Harteneck |
| 2012/0027066 A1 | 2/2012 | O'Keeffe |
| 2012/0230380 A1 | 9/2012 | Keusgen et al. |
| 2013/0271328 A1 | 10/2013 | Nickel et al. |
| 2013/0342404 A1 | 12/2013 | Anderson |

* cited by examiner

WIRELESS-CHANNEL CHARACTERIZATION AND EQUALIZATION

GOVERNMENT INTEREST

The innovation described herein may be manufactured, used, imported, sold, and licensed by or for the Government of the United States of America without the payment of any royalty thereon or therefor.

BACKGROUND

In order to communicate information among one another, entities can employ antennas that send signals to and from one another such as by using radios. In a trial environment, these signals can be communicated among the antennas with relative ease. However, in a real-world environment, these signals can experience real-world interference and thus not be optimally communicated. Therefore, improved signal communication may be desirable.

SUMMARY

In one embodiment, a system comprises a distortion component and a distorted signal emission component. The distortion component can be configured to distort a signal of interest in accordance with a distortion scheme to form a distorted signal of interest that is not identical to the signal of interest. The distorted signal emission component can be configured to cause an emission of the distorted signal of interest from a transmission antenna to a reception antenna. The distortion scheme can compensate for anticipated delay and attenuation produced from travel of the signal of interest over an indirect path from the transmission antenna to the reception antenna. The transmission antenna and reception antenna communicate in different languages. The identification component, the distorted signal emission component, or a combination thereof is implemented, at least in part, by way of non-software.

In one embodiment, a method comprises collecting, by way of a reception antenna, a test signal transmitted by a transmission antenna that travels by way of a first path as well as collecting, by way of the reception antenna, the test signal transmitted by the transmission antenna that travels by way of a second path that is different from the first path. The method also comprises calculating a first coefficient set for the test signal transmitted by the transmission antenna that travels by way of the first path, in addition to calculating a second coefficient set for the test signal transmitted by the transmission antenna that travels by way of the second path. The method additionally comprises transmitting, by way of the reception antenna, the first coefficient set and the second coefficient set to the transmission antenna. The transmission antenna and the reception antenna are two different antennas and the first path, the second path, or a combination thereof is an indirect path. The distortion scheme for a signal of interest transmitted from the transmission antenna to the reception antenna can be based, at least in part, on the first coefficient set and the second coefficient set.

In one embodiment, a system comprises a first transceiver antenna that wirelessly transmits a test signal. In addition, the system comprises a second transceiver antenna that wirelessly receives the test signal. The system also comprises a computation component that computes a delay coefficient set of the test signal and calculates an attenuation coefficient set of the test signal. The system additionally comprises a plan component that determines a modification plan for a signal of interest based, at least in part, on the delay coefficient set of the test signal and the attenuation coefficient set of the test signal. The plan component is associated with the first transceiver antenna and the computation component is associated with the second transceiver antenna. The second transceiver antenna can transmit the delay coefficient set and the attenuation coefficient set to the first transceiver antenna. The first transceiver antenna can receive the delay coefficient set and the attenuation coefficient set.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
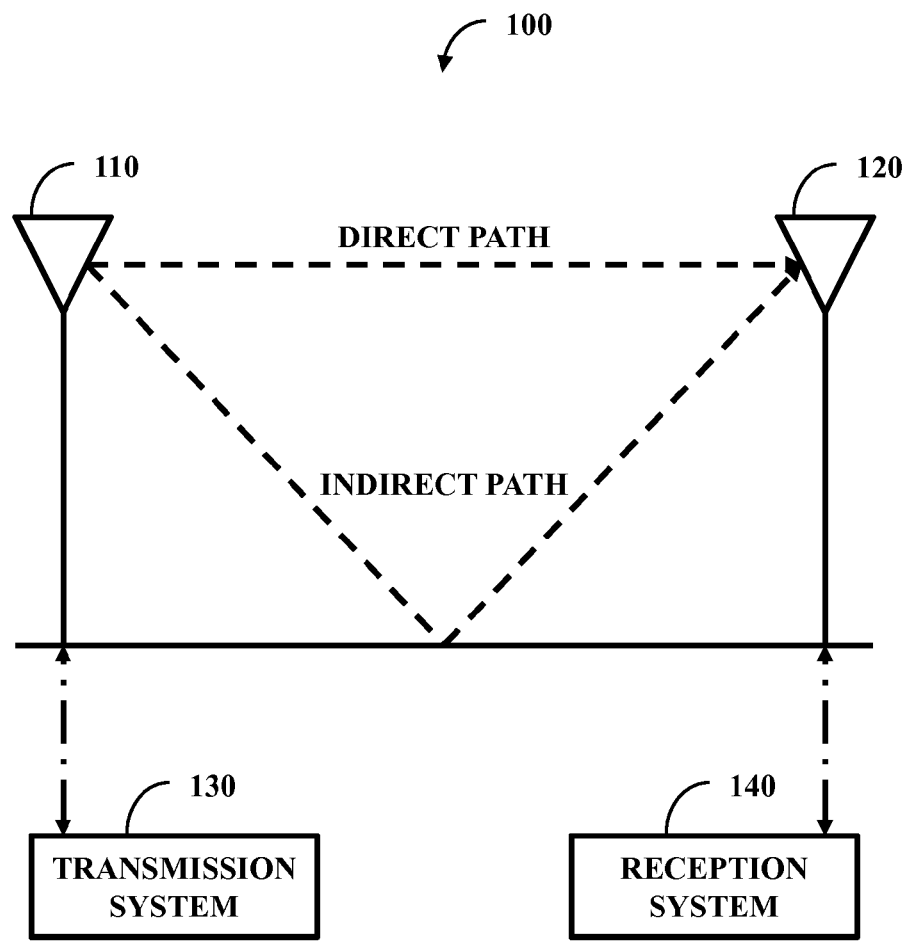
FIG. 1 illustrates one embodiment of a communication network in a first circumstance.

In one embodiment, when a signal of interest is transmitted from one antenna to another, the signal experiences an unintended and avoidable attenuation and delay. In order to remove this attenuation and delay, a modified signal of interest can be transmitted that compensates for indirect transmission paths. A baseline signal and a test signal can be used to determine how to modify the signal of interest to have the desired result.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIGS. 1-5 illustrate embodiments of a communications network in different circumstances 100-500. In each of the circumstances 100-500, a system can comprise a first transceiver antenna 110 and a second transceiver antenna 120. The transceiver antennas 110-120 can function in a transmission role and in a reception role. In one example, in the circumstance 100, the first transceiver 110 can function as a transmission antenna and the second transceiver 120 can function as a reception antenna 120. The transmission antenna 110 can be associated with a transmission system 130 and a reception system 140. References to a specific antenna are provided for clarifying purposes for a reader and are not intended to limit the scope of the claims or innovative depth (e.g., reference to the reception antenna 120 of FIG. 3 means that this can also be the reception antenna 120 of FIG. 4). While each antenna 110-120 is shown as being associated with one system 130 or 140, it is to be appreciated by one of ordinary skill in the art that each antenna 110-120 can function with being associated with both systems 130 and 140.

Circumstance 100 can be considered a common situation when a signal is transmitted from the transmission antenna 110 to the reception antenna 120. The transmission antenna 110 can transmit the signal omni-directionally. However, for clarity FIG. 1 illustrates two directions of transmission. Due to multiple directions, it is possible that the signal will reach the reception antenna 120 by way of different paths, such as a direct path (e.g., straightest path between the transmission antenna 110 and the reception antenna 120 that is unobstructed) and an indirect path (e.g. a path that reflects off ground or a signal version travels through an object). If, for example, a signal version travelling along the indirect path reflects off an object, that signal version can lose energy when received by the reception antenna 120 and therefore can be difficult to process. Due to these different paths, different signal versions can reach the reception antenna with different delay coefficients and different attenuation coefficients. The reception system 140 can sum together these signal versions such that a total delay coefficient and a total attenuation coefficient are produced.

It can be desirable for a signal of interest to reach the reception antenna 120 with a minimal delay coefficient and a minimal attenuation coefficient. Aspects disclosed herein can be used to have the signal of interest reach the reception antenna in that manner. Circumstances 200-500 can be viewed as four sequential events that can occur for signal communication.

With the circumstance 200, the transmission antenna 110 can function as a directional antenna such that an emitted signal travels in one direction as opposed to omni-directional. While functioning as the directional antenna, the transmission antenna 110 can transmit a baseline signal to the reception antenna 120. The reception antenna 120 receives the baseline signal that includes a direct delay coefficient and a direct attenuation coefficient. The reception system 140 can access the baseline signal by way of the reception antenna 120, identify the direct delay coefficient and the direct attenuation coefficient, and retain those coefficients in storage.

With the circumstance 300, the transmission antenna 110 can function as an omni-directional antenna. The transmission antenna 110 can transmit a test signal to the reception antenna 120 that the reception antenna 120 receives. The test signal can be transmitted such that the test signal takes a direct path and an indirect path from the transmission antenna 110 to the reception antenna 120 and thus the reception antenna 120 receives different versions of the test signal.

With circumstance 400, the reception system 140 can process the different versions to determine the delay coefficients of the versions and the attenuation coefficients of the versions. This processing can comprise comparing individual versions against the baseline signal discussed in circumstance 200 to produce comparison results. These comparison results can be transmitted by the reception antenna 120 to the transmission antenna 110 as at least a part of delay and attenuation data.

With the circumstance 500, the transmission system 130 can process the delay and attenuation data received by the transmission antenna 110. Based on this processing, the transmission system 130 can determine how to modify the signal of interest such that the signal of interest reaches the reception antenna 120 from the transmission antenna 110 without indirect path delay or attenuation coefficients. The transmission antenna 110 can transmit the modified signal of interest such that the reception antenna receives the signal of interest in a preferred form—one not impacted by indirect attenuation or delay coefficients. While being shown as having one direct path and one indirect path, one of ordinary skill in the art will appreciate that the circumstances 300 and 500 can have more than two paths and/or be absent a direct path (a non-reflected and non-obstructed path).

The signals discussed in circumstances 100-500 can be radio frequency (RF) signals. The RF signals can be used to characterize various propagation paths traveled by the RF signals (e.g., due to obstructions and/or intervening physical objects between the transmission antenna 110 and the reception antenna 120) and to compensate for resulting signal corruption. This characterization can detect imposed distortion and perform compensation and/or equalization techniques to overcome such distortion. These compensation and/or equalization techniques can be used to improve fidelity of received RF signals even when many obstructions exist. Aspects disclosed herein can be used in inter-satellite communications, cellular communications, etc. Further, aspects can be used for diagnostic purposes (e.g., measure wireless-channel distortion) or as a measure and compensate solution.

Figure 5:
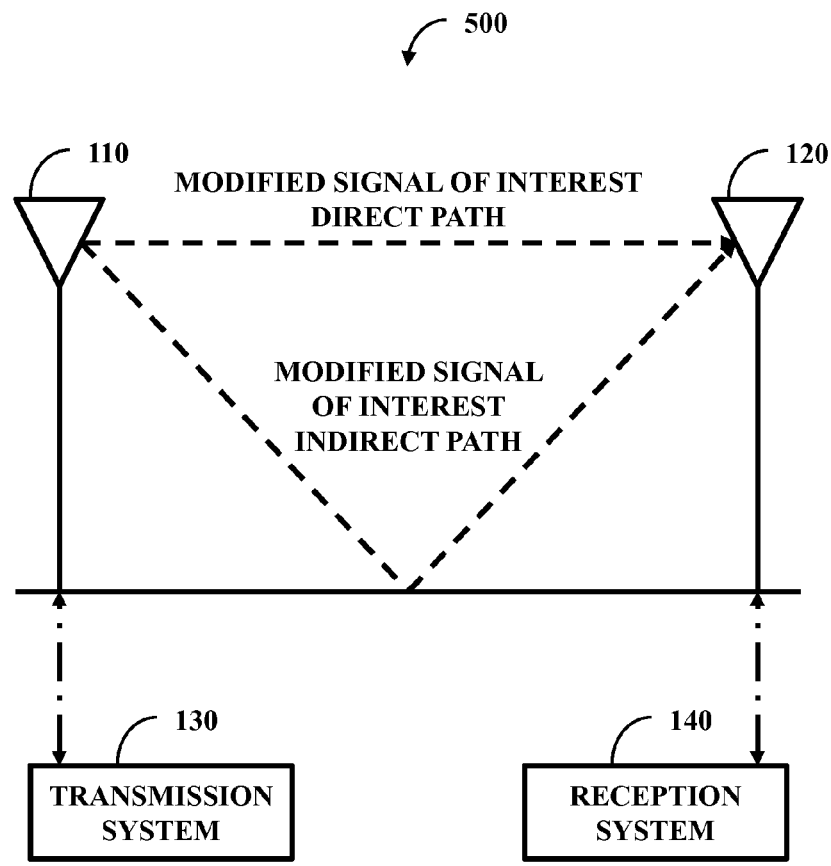
FIG. 5 illustrates one embodiment of the communication network in a fifth circumstance.
Figure 6:
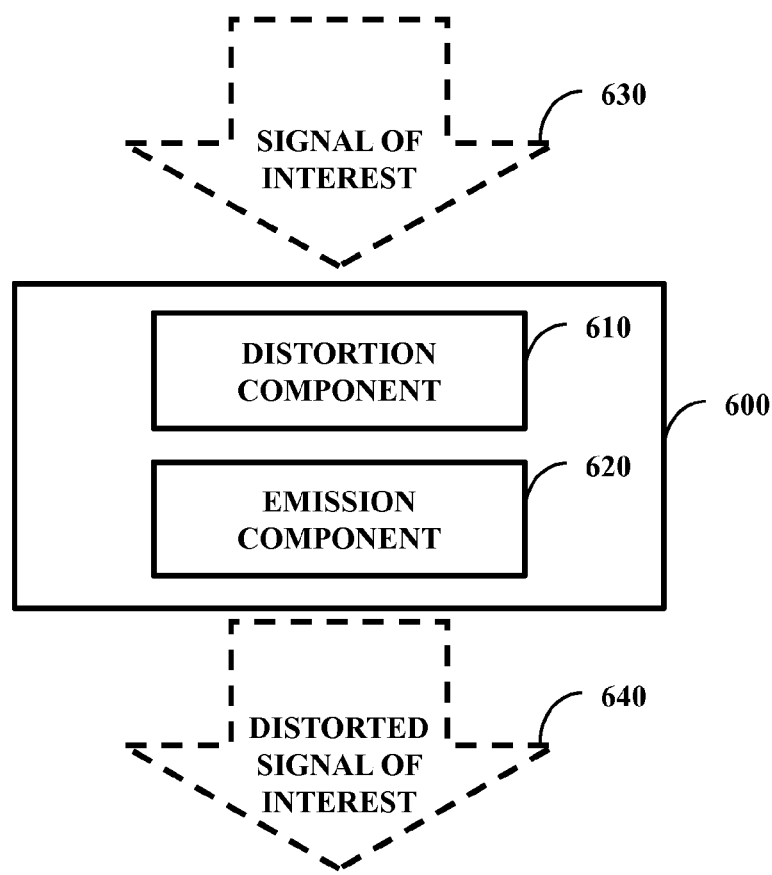
FIG. 6 illustrates one embodiment of a system comprising a distortion component and an emission component.

FIG. 6 illustrates one embodiment of a system 600 comprising a distortion component 610 and an emission component 620. The distortion component 610 and/or the emission component 620 can be part of the transmission system 130 of FIGS. 1-5. The distortion component 610 can be configured to distort a signal of interest 630 in accordance with a distortion scheme. This can form a distorted signal of interest 640 that is not identical to the signal of interest 630 and that is emitted by the emission component 620. This distortion can occur in the time domain (e.g., through use of signal processing techniques) and/or in the spatial domain (e.g., through use of a phased antenna array).

The distortion scheme can compensate for anticipated delay and attenuation produced from travel of the signal of interest 630 over an indirect path from the transmission antenna 110 of FIG. 5 to the reception antenna 120 of FIG. 5. In one example, omni-directional communication of a signal from the transmission antenna 110 of FIG. 5 to the reception antenna 120 of FIG. 5 can travel by way of a direct path and multiple indirect paths. The distortion scheme can be such that the delay and attenuation of versions of the distorted signal of interest 640 that travels by way of the indirect paths cancel one another out when the distorted signal of interest 640 reaches the reception antenna 120 of FIG. 5. When the reception antenna 120 of FIG. 5 sums together the versions, total delay and attenuation can be reduced or eliminated.

The emission component 620 can function as a distorted signal emission component that is configured to cause an emission of the distorted signal of interest 640. The distorted signal of interest can travel from the transmission antenna 110 of FIG. 5 to the reception antenna 120 of FIG. 5 and have sufficient energy (e.g., strength) so that the signal of interest can be detected at the reception antenna 120 of FIG. 5. The transmission antenna 110 of FIG. 5 and reception antenna 120 of FIG. 5 can communicate in different languages (e.g., the transmission antenna 110 of FIG. 5 is part of network A and communicates in language AA while the reception antenna 120 of FIG. 5 is part of network B and communicates in language BB). Thus, emission from a network entity communicating in a first language can be understood by a network entity communicating in a second and different language. Languages can include communication protocols or modulation formats.

Figure 7:
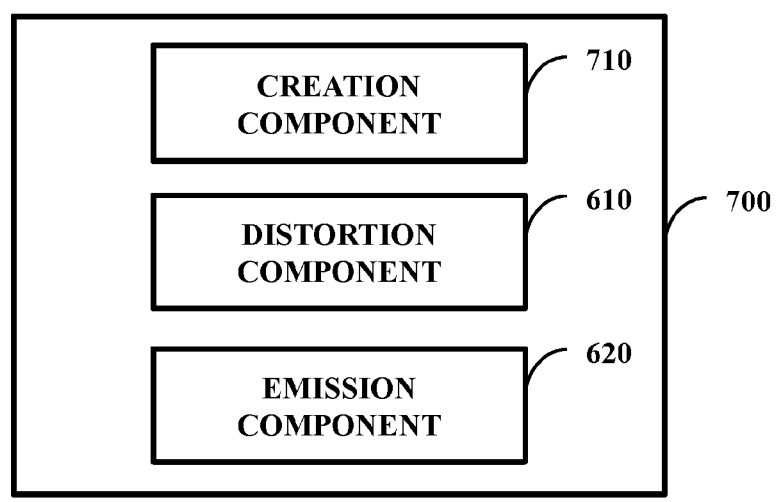
FIG. 7 illustrates one embodiment of a system comprising the distortion component, the emission component, and a creation component.

FIG. 7 illustrates one embodiment of a system 700 comprising the distortion component 610, the emission component 620, and a creation component 710. The emission component 620 can function as a white noise emission component. The white noise emission component can be configured to cause an emission of a white noise signal (e.g., the test signal discussed in FIG. 3) from the transmission antenna 110 of FIG. 2 to the reception antenna 120 of FIG. 3 prior to the emission of the distorted signal of interest (e.g., prior to the circumstance 500 of FIG. 5).

The creation component 710 can be configured to create the distortion scheme used to distort the signal of interest 630 of FIG. 6. The distortion scheme can be based, at least in part, on a response to the emission of the white noise signal. The creation component 710 can identify what the make-up of the white noise signal should be, when the white noise signal should be emitted, etc. Once the white noise signal is known, the emission component 620 can cause emission of the white noise signal.

Figure 2:
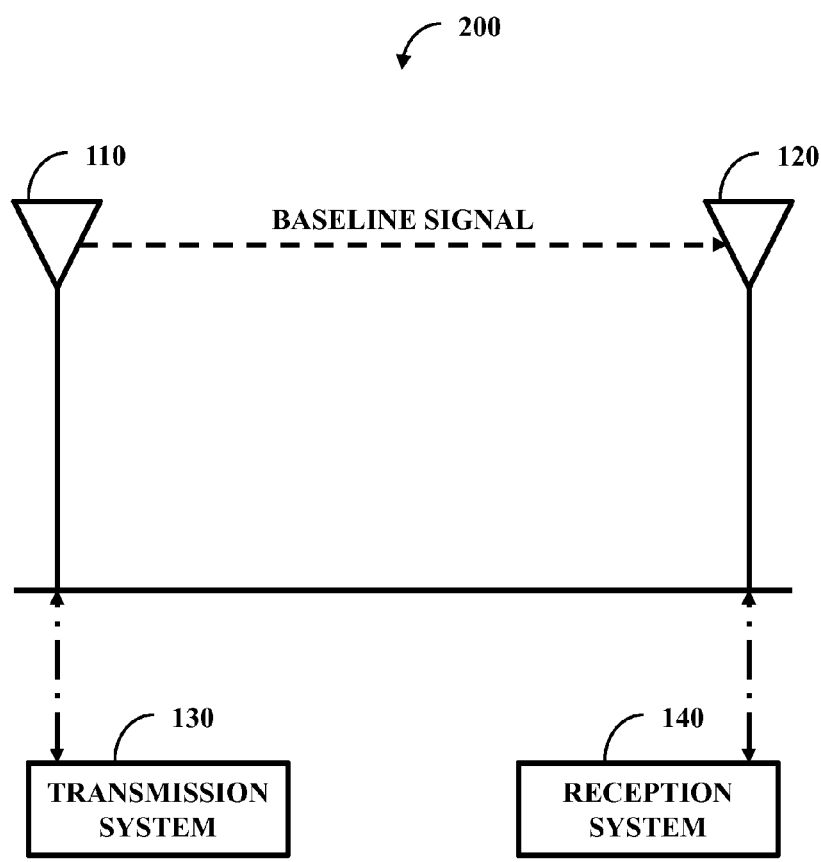
FIG. 2 illustrates one embodiment of the communication network in a second circumstance.
Figure 3:
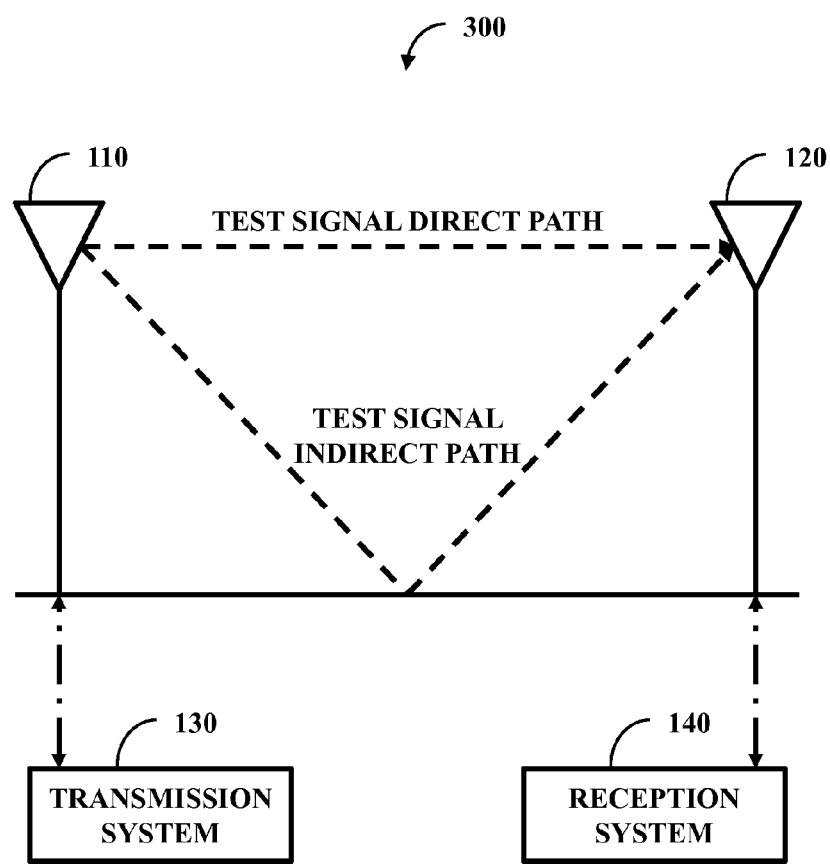
FIG. 3 illustrates one embodiment of the communication network in a third circumstance.

In one embodiment, the emission component 620 can function as a baseline emission component that is configured to cause an emission of a baseline signal (e.g., the baseline signal discussed for circumstance 300 in FIG. 3). Emission of the baseline signal can occur prior to the emission of the white noise signal and be from the transmission antenna 110 of FIG. 2 to the reception antenna 120 of FIG. 2. The creation component 710 can be configured to create the distortion scheme based, at least in part, on the response to the emission of the white noise signal and based, at least in part, on a response to the emission of the baseline signal (e.g., represented by the delay and attenuation data discussed in circumstance 400 of FIG. 4).

In one embodiment, the white noise signal is transmitted outside a frequency band of the signal of interest 630 of FIG. 6. In one example, circumstances 100-500 of FIGS. 1-5 can function in the Frequent Modulation (FM) frequency band of 87.5 megahertz to 108 megahertz. In order to not interfere with operation and communication of the transmission antenna 110 and reception antenna 120 discussed above, the white noise signal can be outside the FM frequency band. Therefore, the emission component 620 can function to identify an in-use band and select a frequency for the baseline signal and/or the white noise signal that is used in transmission.

Figure 8:
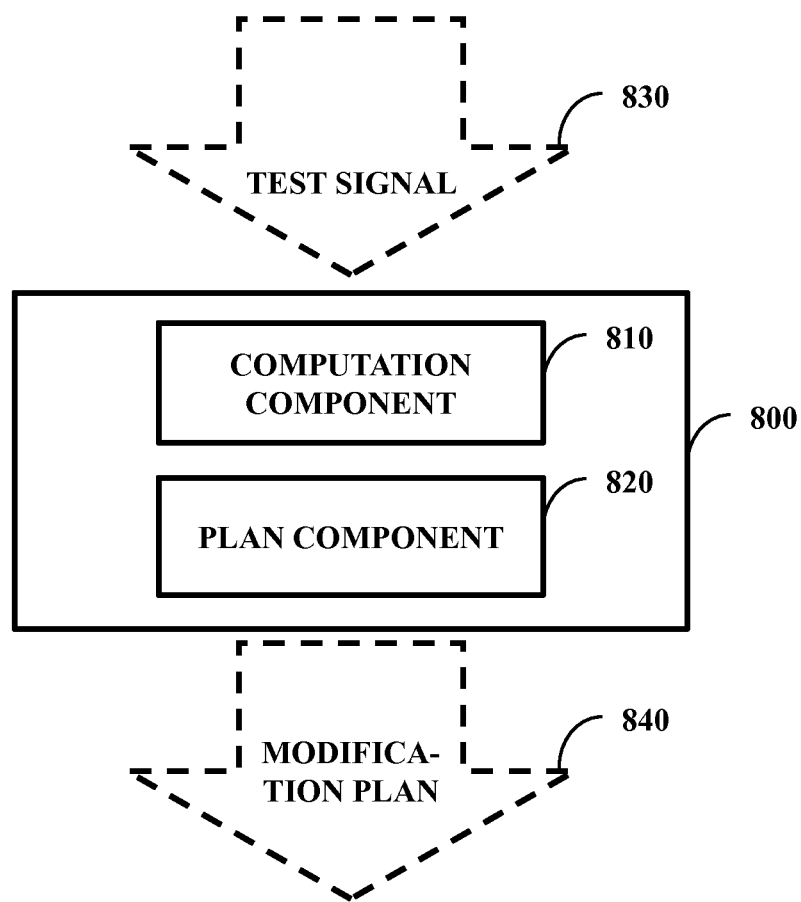
FIG. 8 illustrates one embodiment of a system comprising a computation component and a plan component.

FIG. 8 illustrates one embodiment of a system 800 comprising a computation component 810 and a plan component 820. The computation component 810 can be part of the reception system 140 discussed above with regard to FIGS. 1-5 and thus be associated with the second transceiver antenna 120 of FIG. 3. Similarly, the plan component 820 can be part of the transmission system 130 discussed above with regard to FIGS. 1-5 and thus be associated with the first transceiver antenna 110 of FIG. 3. As discussed above for circumstance 300, the first transceiver antenna 110 of FIG. 3 can wirelessly transmit a test signal 830 (e.g., by way of a first path and a second path that are different paths) while the second transceiver antenna 120 of FIG. 3 can wirelessly receive the test signal 830 (e.g., by way of the first path and the second path with the first path, the second path, or a combination thereof being an indirect path).

The computation component 810 can compute a delay coefficient set of the test signal 830 and calculate an attenuation coefficient set of the test signal 830. For the calculation, individual signal versions from different paths can be identified and their individual delay coefficients and attenuation coefficients can be calculated. These individual coefficients can be organized by the computation component 810 into their respective sets as part of the computation process.

In one embodiment, the computation component 810 can calculate a first delay coefficient based on the test signal 830 received from the first path and calculate a second delay coefficient based on the test signal 830 received from the second path. Similarly, the computation component 810 can calculate a first attenuation coefficient based on the test signal 830 received from the first path and calculate a second attenuation coefficient based on the test signal 830 received from the second path. The delay coefficient set can comprise the first delay coefficient and the second delay coefficient while the attenuation coefficient set can comprise the first attenuation coefficient and the second attenuation coefficient.

Figure 4:
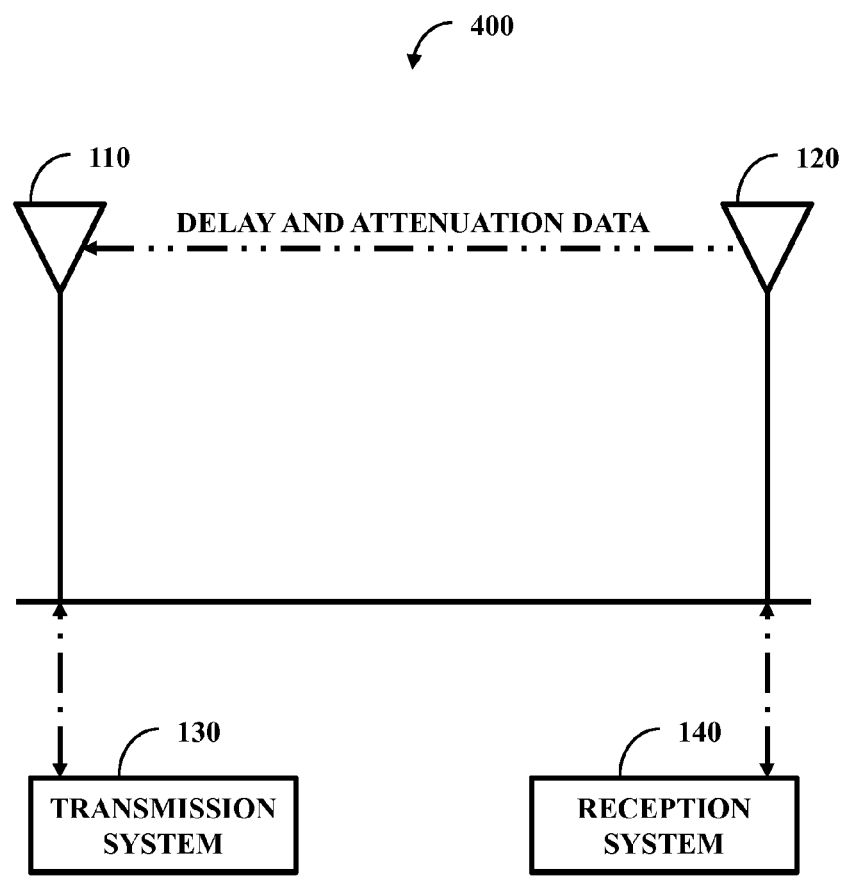
FIG. 4 illustrates one embodiment of the communication network in a fourth circumstance.

The second transceiver antenna 120 of FIG. 4 can transmit the delay coefficient set and the attenuation coefficient set to the first transceiver antenna 110 of FIG. 4. These sets can be part of the delay and attenuation data illustrated in FIG. 4. The first transceiver antenna 110 of FIG. 4 can receive these sets and transfer them to the plan component 820.

The plan component 820 can determine a modification plan 840 for the signal of interest 630 of FIG. 6. This determination can be based, at least in part, on the delay coefficient set of the test signal 830 and the attenuation coefficient set of the test signal 830. In one embodiment, the plan component 820 can function after the first transceiver antenna 110 of FIG. 4 receives the delay coefficient set and the attenuation coefficient set. The distortion component 610 of FIG. 6 can then distort the signal of interest 630 of FIG. 6 according to the modification plan 840 that functions as the distortion scheme. The first transceiver antenna 110 of FIG. 5 can emit the signal of interest in accordance with the modification plan (e.g., the distorted signal of interest 640 of FIG. 6) in response to a command from the emission component 620.

Figure 9:
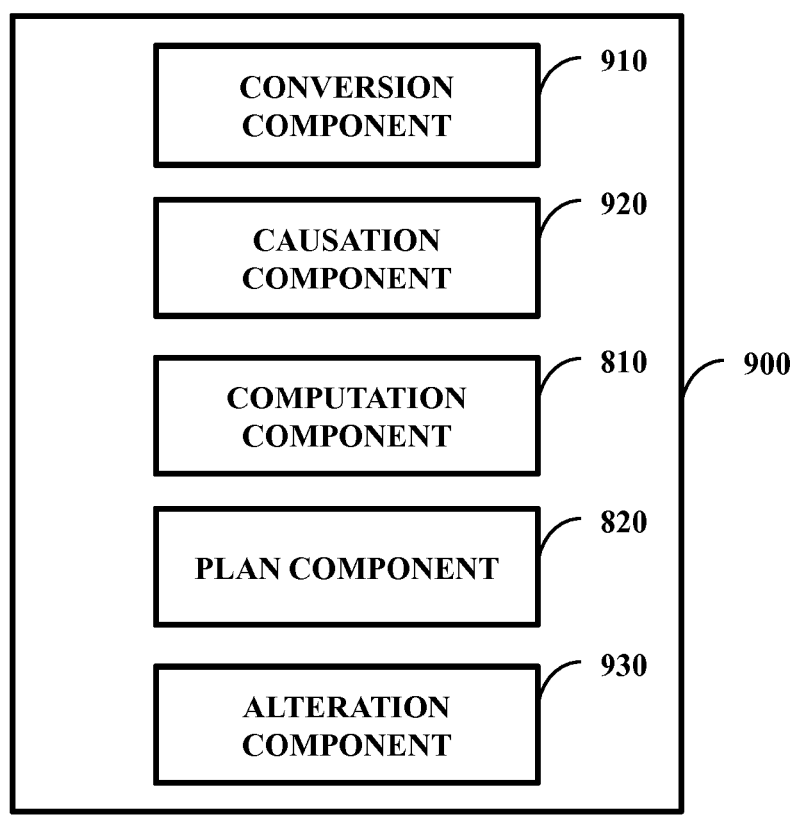
FIG. 9 illustrates one embodiment of a system comprising the computation component, the plan component, a conversion component, a causation component, and an alteration component.

FIG. 9 illustrates one embodiment of a system 900 comprising the computation component 810, the plan component 820, a conversion component 910, a causation component 920, and an alteration component 930. In one embodiment, the alteration component 930 functions as the distortion component 610 of FIG. 6 and the causation component 920 functions as the emission component 620 of FIG. 6. The alteration component 930 can alter the signal of interest 630 of FIG. 6 in accordance with the modification plan to produce an altered signal of interest (e.g., the distorted signal of interest 640 of FIG. 6). Alteration of the signal of interest can be in the time domain or the spatial domain.

The causation component 920 can cause the first transceiver antenna 110 of FIG. 5 to emit the altered signal of interest. The second transceiver antenna 120 of FIG. 5 can receive the altered signal of interest such that the signal of interest 630 of FIG. 6 is received absent indirect delay or attenuation. In addition, the causation component 920 can cause the baseline signal discussed with regard to circumstance 200 of FIG. 2 to be emitted when the first transceiver antenna 110 of FIG. 2 functions as a directional antenna.

In one embodiment, the conversion component 910 can convert the first transceiver antenna 110 of FIG. 2 from an omni-directional antenna to a directional antenna. The conversion component 910 can also convert the first transceiver antenna 110 of FIG. 3 from the directional antenna to the omni-directional antenna. The causation component 920 can cause the baseline signal to be emitted when the first transceiver antenna 110 of FIG. 2 functions as the directional antenna. Similarly, the causation component 920 can cause the test signal 830 of FIG. 8 to be emitted when the first transceiver antenna 110 of FIG. 3 functions as the omni-directional antenna. Further, the causation component 920 can cause the altered signal of interest to be emitted when the first transceiver antenna 110 of FIG. 5 functions as the omni-directional antenna. Therefore, the conversion component 910 can function to switch an antenna disclosed herein to and from omni-directional and directional (single direction).

Figure 10:
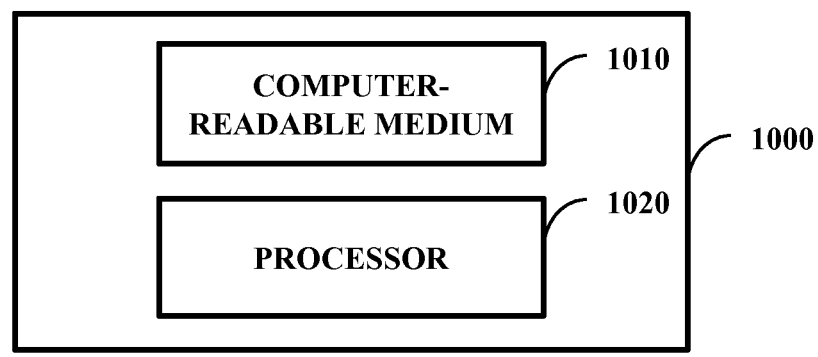
FIG. 10 illustrates one embodiment of a system comprising a processor and a computer-readable medium and a processor.

FIG. 10 illustrates one embodiment of a system 1000 comprising a computer-readable medium 1010 (e.g., non-transitory computer-readable medium) and a processor 1020. In one embodiment, the computer-readable medium 1010 is communicatively coupled to the processor 1020 and stores a command set executable by the processor 1020 to facilitate operation of at least one component disclosed herein (e.g., the distortion component 610 of FIG. 6 and/or the emission component 620 of FIG. 6). In one embodiment, at least one component disclosed herein (e.g., the computation component 810 of FIG. 8 and/or the plan component 820 of FIG. 8) can be implemented, at least in part, by way of non-software, such as implemented as hardware by way of the system 1000. The system 1000 can function as the transmission system 130 of FIGS. 1-5 and/or the reception system 140 of FIGS. 1-5. In one embodiment the computer-readable medium 1010 is configured to store processor-executable instructions that when executed by the processor 1020, cause the processor 1020 to perform a method disclosed herein (e.g., the methods 1100-1400 addressed below).

Figure 11:
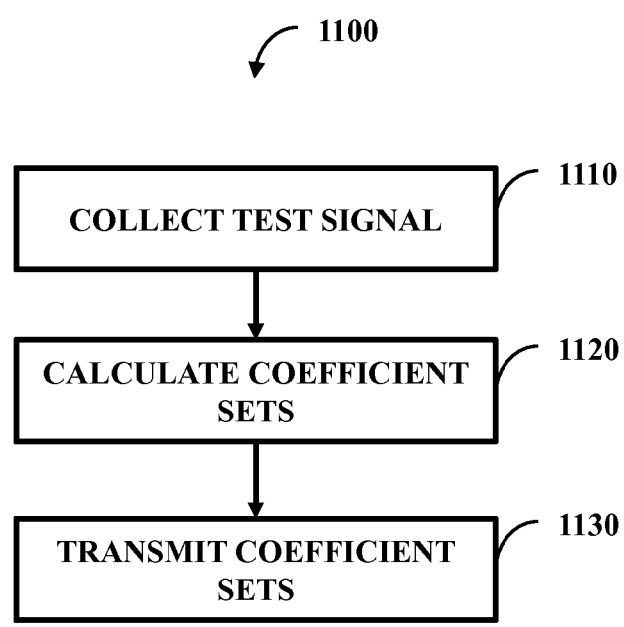
FIG. 11 illustrates one embodiment of a method comprising three actions.

FIG. 11 illustrates one embodiment of a method 1100 comprising three actions 1110-1130. At 1110, the test signal 830 of FIG. 8 that is transmitted by the transmission antenna 110 of FIG. 3 is collected by way of the reception antenna 120 of FIG. 3. From the transmission antenna 110 of FIG. 3 to the reception antenna 120 of FIG. 3 the test signal 830 of FIG. 8 can travel by way of a first path and a second path that are different from another (e.g., the first path being a first indirect path and the second path being a different indirect path). At 1120, calculations can occur. These calculations can include calculating a first coefficient set for the test signal 830 of FIG. 8 transmitted by the transmission antenna 110 of FIG. 3 that travels by way of the first path. These calculations can also include calculating a second coefficient set for the test signal 830 of FIG. 3 transmitted by the transmission antenna 110 of FIG. 3 that travels by way of the second path. At 1130, transmitting (e.g., by way of the reception antenna 120 of FIG. 4) the first coefficient set and the second coefficient set to the transmission antenna 110 of FIG. 4 can occur.

In one embodiment, a distortion scheme for a signal of interest 630 of FIG. 6 (e.g., that is transmitted as the distorted signal of interest 640 of FIG. 6 from the transmission antenna 110 of FIG. 5 to the reception antenna 120 of FIG. 5) can be based, at least in part, on the first coefficient set and the second coefficient set. The first coefficient set can comprise a first delay coefficient that results from the first path and a first attenuation coefficient that results from the first path. Similarly, the second coefficient set can comprise a second delay coefficient that results from the second path and a second attenuation coefficient that results from the second path.

Figure 12:
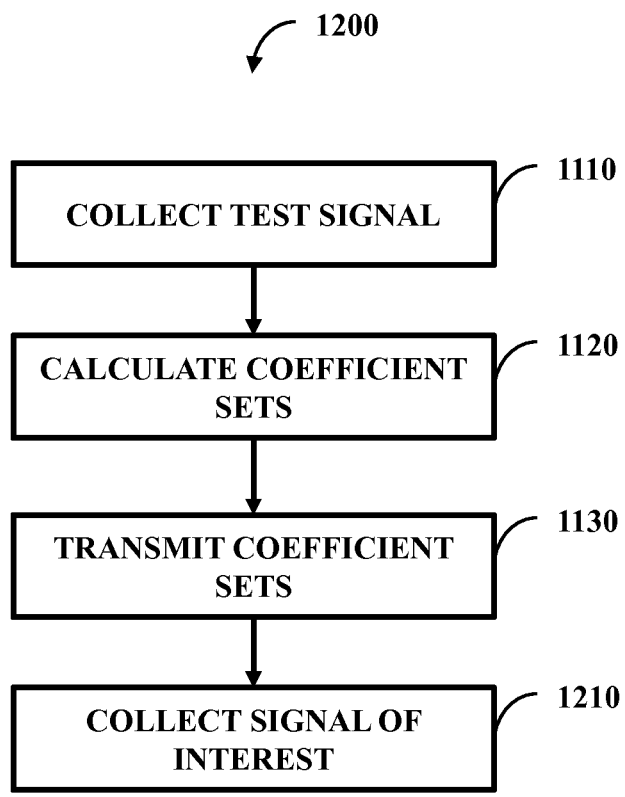
FIG. 12 illustrates one embodiment of a method comprising four actions.

FIG. 12 illustrates one embodiment of a method 1200 comprising four actions 1110-1130 and 1210. Actions 1110-1130 can be repeated from the method 1100 of FIG. 11. At 1210, there can be collecting (e.g., by way of the reception antenna 120 of FIG. 5), the signal of interest in an alternated form (e.g., distorted signal of interest 640 of FIG. 6) according to the distortion scheme, such that a summed version of the signal of interest has a net delay of about zero and a net attenuation of about zero. Net delay and net attenuation can take into account delay and attenuation from both direct and indirect paths (e.g., all measured delay and attenuation).

Figure 13:
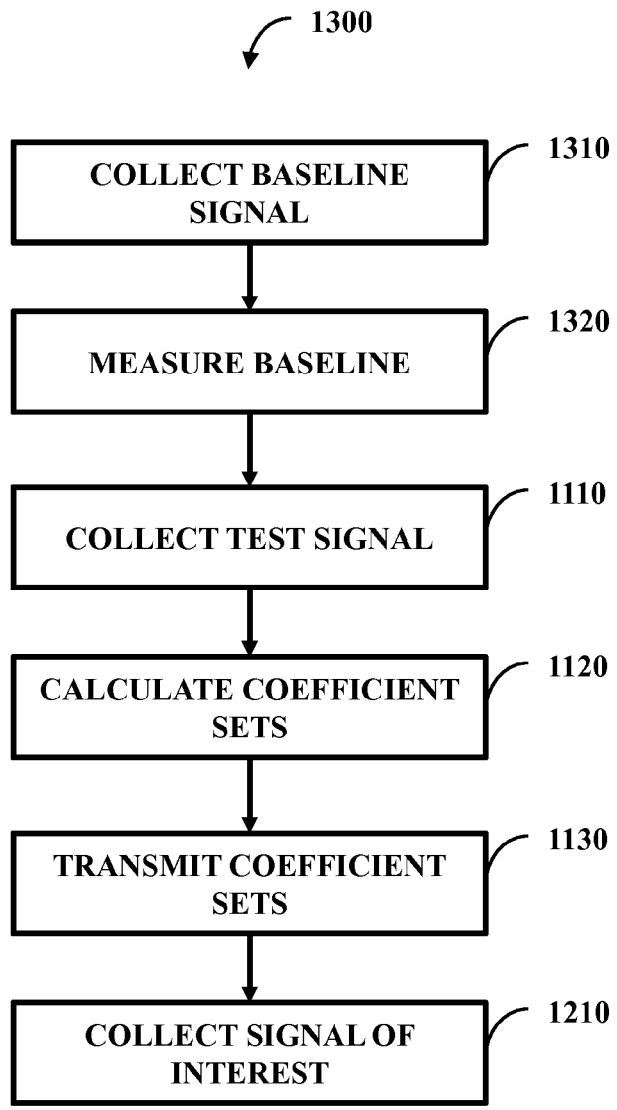
FIG. 13 illustrates one embodiment of a method comprising six actions.

FIG. 13 illustrates one embodiment of a method 1300 comprising six actions 1110-1130, 1210, and 1310-1320. Actions 1110-1130 can be repeated from the method 1100 of FIG. 11 while action 1210 can be repeated from the method 1200 of FIG. 12. At 1310, collecting a baseline signal from the transmission antenna 110 of FIG. 2 can occur (e.g., before action 1110). This collection can occur by way of the reception antenna 120 of FIG. 2. At 1320, measuring a baseline measurement through use of the baseline signal can occur. In one example, the baseline signal can function as a stimulus of a wireless channel and a cross-correlation can be performed between what is sent from the transmission antenna 110 of FIG. 2 and what is received by the reception antenna 120 of FIG. 2 to determine the impulse response of the wireless channel. In one example, the wireless channel can be a dynamically-varying communication channel and therefore the baseline measurement can be taken repeatedly (e.g., outside the frequency band).

In one embodiment, calculating the first coefficient set for the test signal 830 of FIG. 8 transmitted by the transmission antenna 110 of FIG. 3 that travels by way of the first path comprises comparing the test signal 830 of FIG. 8 transmitted by the transmission antenna 110 of FIG. 3 that travels by way of the first path against the baseline measurement. Similarly, calculating the second coefficient set for the test signal 830 of FIG. 8 transmitted by the transmission antenna 110 of FIG. 3 that travels by way of the second path comprises comparing the test signal 830 of FIG. 8 transmitted by the transmission antenna 110 of FIG. 3 that travels by way of the second path against the baseline measurement. The test signal 830 of FIG. 8 can be transmitted outside a frequency band of the signal of interest 630 of FIG. 6. The transmission antenna 110 of FIG. 2 can function as a directional antenna when transmitting the baseline signal. The transmission antenna 110 of FIG. 3 can function as a multi-directional antenna when transmitting the test signal. The transmission antenna 110 of FIG. 1 and reception antenna 120 of FIG. 1 can communicate in different languages.

Figure 14:
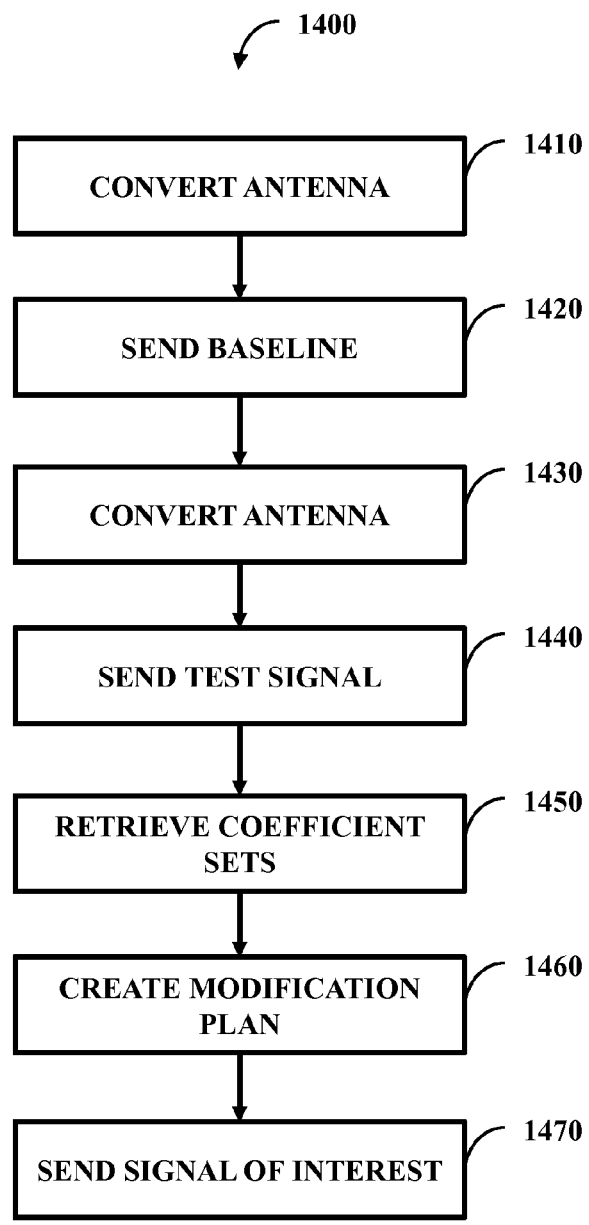
FIG. 14 illustrates one embodiment of a method comprising seven actions.

FIG. 14 illustrates one embodiment of a method 1400 comprising seven actions 1410-1470. The method 1400 can be an example of how the transmission antenna 110 of FIGS. 1-5 functions, such as along with the transmission system 130 of FIGS. 1-5 (e.g., the methods 1100 of FIGS. 11 and 1200 of FIG. 12 can be examples of how the reception antenna 120 of FIGS. 1-5 functions with the reception system 140 of FIGS. 1-5). At 1410 the antenna can be converted, such as converted from onmi-directional to directional (e.g., through use of a relay-based switching network). As a directional antenna, the baseline signal can be transmitted at 1420 as illustrated in FIG. 14. The antenna can be converted back to omni-directional at 1430 and the test signal 830 of FIG. 8 can be sent at 1440 as illustrated in FIG. 3. The reception antenna 120 of FIG. 3 can receive the test signal 830 of FIG. 8 and in response, send back coefficient sets that are received at 1450. These coefficient sets can be analyzed and in response to this analysis, a modification plan can be created at 1460. A modified version of the signal of interest can be sent at 1470.

What is claimed is:

1. A system, comprising:
a distortion component configured to distort a signal of interest in accordance with a distortion scheme to form a distorted signal of interest that is not identical to the signal of interest; and
a distorted signal emission component configured to cause an emission of the distorted signal of interest from a transmission antenna to a reception antenna,
where the distortion scheme compensates for anticipated delay and attenuation produced from travel of the signal of interest over an indirect path from the transmission antenna to the reception antenna,
where the transmission antenna and reception antenna communicate in different languages, and
where the identification component, the distorted signal emission component, or a combination thereof is implemented, at least in part, by way of non-software.

2. The system of claim 1, where the distortion of the signal of interest occurs in a time domain.

3. The system of claim 1, where the distortion of the signal of interest occurs in a spatial domain.

4. The system of claim 3, where the distortion of the signal of interest occurs through use of a phased antenna array.

5. The system of claim 1, comprising:
a white noise emission component configured to cause an emission of a white noise signal from the transmission antenna to the reception antenna prior to the emission of the distorted signal of interest; and
a creation component configured to create the distortion scheme based, at least in part, on a response to the emission of the white noise signal.

6. The system of claim 5, comprising:
a baseline emission component configured to cause an emission of a baseline signal from the transmission antenna to the reception antenna prior to the emission of the white noise signal,
where the creation component is configured to create the distortion scheme based, at least in part, on the response to the emission of the white noise signal and based, at least in part, on a response to the emission of the baseline signal.

7. The system of claim 6, where white noise signal is transmitted outside a frequency band of the signal of interest.

8. A method, comprising:
collecting, by way of a reception antenna, a test signal transmitted by a transmission antenna that travels by way of a first path;
collecting, by way of the reception antenna, the test signal transmitted by the transmission antenna that travels by way of a second path that is different from the first path;
calculating a first coefficient set for the test signal transmitted by the transmission antenna that travels by way of the first path;
calculating a second coefficient set for the test signal transmitted by the transmission antenna that travels by way of the second path; and
transmitting, by way of the reception antenna, the first coefficient set and the second coefficient set to the transmission antenna;
where the transmission antenna and the reception antenna are two different antennas,
where the first path, the second path, or a combination thereof is an indirect path, and
where a distortion scheme for a signal of interest transmitted from the transmission antenna to the reception antenna is based, at least in part, on the first coefficient set and the second coefficient set.

9. The method of claim 8,
where the first coefficient set comprises a first delay coefficient that results from the first path and a first attenuation coefficient that results from the first path and
where the second coefficient set comprises a second delay coefficient that results from the second path and a second attenuation coefficient that results from the second path.

10. The method of claim 9, comprising:
collecting, by way of the reception antenna, the signal of interest in an alternated form according to the distortion scheme such that a summed version of the signal of interest has a net delay of about zero and a net attenuation of about zero.

11. The method of claim 10, comprising:
collecting, by way of the reception antenna, a baseline signal from the transmission antenna;
measuring a baseline measurement through use of the baseline signal,
where calculating the first coefficient set for the test signal transmitted by the transmission antenna that travels by way of the first path comprises comparing the test signal transmitted by the transmission antenna that travels by way of the first path against the baseline measurement, where calculating the second coefficient set for the test signal transmitted by the transmission antenna that travels by way of the second path comprises comparing the test signal transmitted by the transmission antenna that travels by way of the first path against the baseline measurement, where the transmission antenna functions as a directional antenna when transmitting the baseline signal, and where the transmission antenna functions as a multi-directional antenna when transmitting the test signal.

12. The method of claim 11, where the test signal is transmitted outside a frequency band of the signal of interest and where the transmission antenna and reception antenna communicate in different languages.

13. A system, comprising:

a first transceiver antenna that wirelessly transmits a test signal;

a second transceiver antenna that wirelessly receives the test signal;

a computation component that computes a delay coefficient set of the test signal and calculates an attenuation coefficient set of the test signal;

a plan component that determines a modification plan for a signal of interest based, at least in part, on the delay coefficient set of the test signal and the attenuation coefficient set of the test signal, where the plan component is associated with the first transceiver antenna, where the computation component is associated with the second transceiver antenna;

where the second transceiver antenna transmits the delay coefficient set and the attenuation coefficient set to the first transceiver antenna, and where the first transceiver antenna receives the delay coefficient set and the attenuation coefficient set.

14. The system of claim 13, where the plan component functions after the first transceiver antenna receives the delay coefficient set and the attenuation coefficient set, and where the first transceiver antenna emits the signal of interest in accordance with the modification plan.

15. The system of claim 14, where the first transceiver antenna wirelessly transmits the test signal in multiple directions, where the second transceiver antenna wirelessly receives the test signal by way of a first path and a second path, where the first path and second path are different paths, and where the first path, the second path, or a combination thereof is an indirect path.

16. The system of claim 15, where the computation component calculates a first delay coefficient based on the test signal received from the first path, where the computation component calculates a second delay coefficient based on the test signal received from the second path, where the computation component calculates a first attenuation coefficient based on the test signal received from the first path, where the computation component calculates a second attenuation coefficient based on the test signal received from the second path, where the delay coefficient set comprises the first delay coefficient and the second delay coefficient, and where the attenuation coefficient set comprises the first attenuation coefficient and the second attenuation coefficient.

17. The system of claim 16, comprising:

an alteration component that alters the signal of interest in accordance with the modification plan to produce an altered signal of interest; and a causation component that causes the first transceiver antenna to emit the altered signal of interest, where the second transceiver antenna receives the altered signal of interest such that the signal of interest is received absent indirect delay or attenuation.

18. The system of claim 17, comprising:

a conversion component that converts the first transceiver antenna from an omni-directional antenna to a directional antenna and that converts the first transceiver antenna from the directional antenna to the omni-directional antenna, where the causation component causes a baseline signal to be emitted when the first transceiver antenna functions as the directional antenna, where the causation component causes the test signal to be emitted when the first transceiver antenna functions as the omni-directional antenna, and where the causation component causes the altered signal of interest to be emitted when the first transceiver antenna functions as the omni-directional antenna.

19. The system of claim 18, where the alteration component alters the signal of interest in the time domain.

20. The system of claim 18, where the alteration component alters the signal of interest in the spatial domain.

* * * * *